United States Patent [19]

deVries

[11] Patent Number: 4,844,874

[45] Date of Patent: Jul. 4, 1989

[54] METHOD AND MEANS FOR CONTROLLING MIST SCRUBBER OPERATION

[75] Inventor: Egbert deVries, Kettering, Ohio

[73] Assignee: Quad Environmental Technologies Corp., Northbrook, Ill.

[21] Appl. No.: 119,534

[22] Filed: Nov. 12, 1987

[51] Int. Cl.⁴ ............... B01D 47/06; C01B 17/56; C01B 17/60; C01B 17/16

[52] U.S. Cl. ............... 423/210; 423/224; 423/235; 423/236; 423/242; 423/240; 423/245.1; 422/168

[58] Field of Search ............ 423/210, 224, 235, 236, 423/245 R, 242 A, 240 R; 422/168

[56] References Cited

U.S. PATENT DOCUMENTS

| | | | |
|---|---|---|---|
| 4,208,383 | 6/1980 | Kisters et al. | 423/240 |
| 4,238,461 | 2/1980 | Devries | 423/245 |
| 4,307,067 | 12/1981 | Togawa et al. | 423/245 |

OTHER PUBLICATIONS

Perry et al., "Perry's Chemical Engineers' Handbook", 6th Ed., 18-3, 18-41 to 42 (McGraw-Hill Book Company).

Primary Examiner—Robert L. Stoll
Assistant Examiner—Adriana L. Eng
Attorney, Agent, or Firm—Roland H. Shubert

[57] ABSTRACT

A control system is provided for a mist scrubbing process in which a gas containing odorous and acidic contaminants is cocurrently contacted in a reaction chamber with tiny droplets of an aqueous reagent to react with and destroy the contaminants. The reagent contains an oxidizing agent and a base and the process is controlled by measuring a property, typically pH, of spent spray liquid settling at the bottom of the chamber. That measurement is used to meter the flow rate of base into the system while at the same time the concentration of an acidic contaminant in the scrubbed gas stream leaving the reaction chamber is measured and that measurement is used to meter the injection rate of an oxidizing agent into the system.

17 Claims, 1 Drawing Sheet

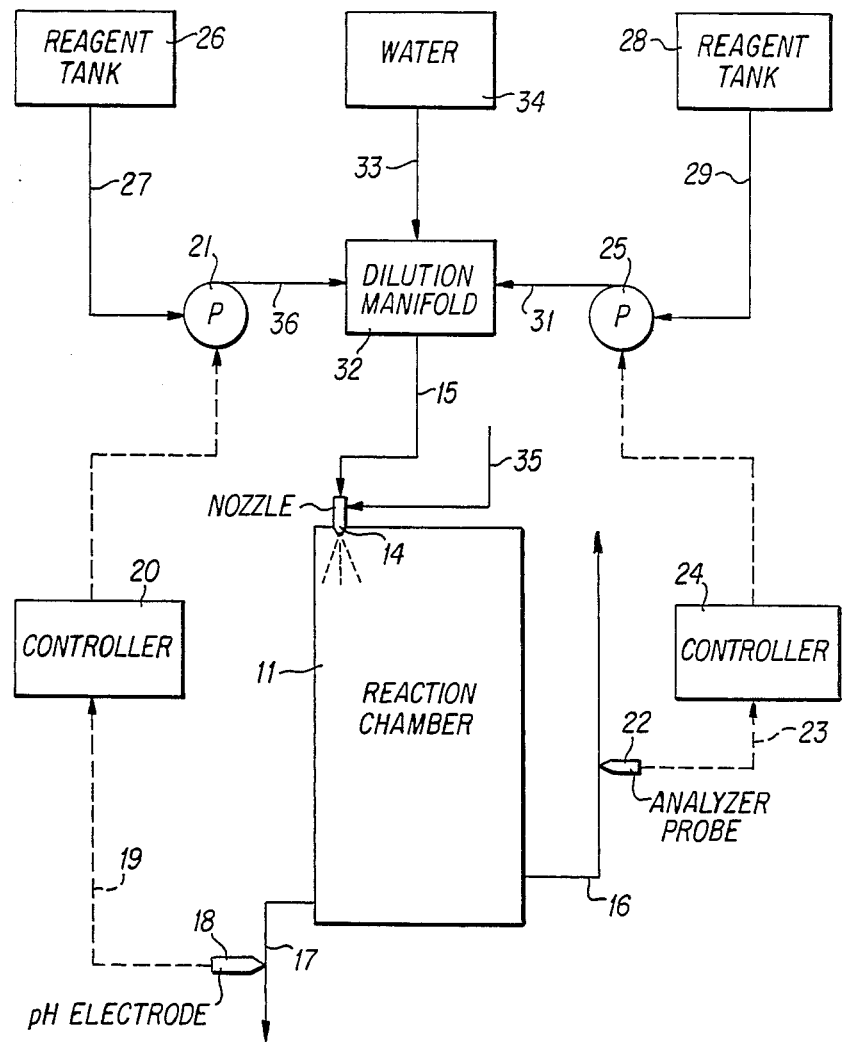

METHOD AND MEANS FOR CONTROLLING MIST SCRUBBER OPERATION

BACKGROUND OF THE INVENTION

1. Field of the Invention

This invention relates generally to a method for the control of a gas scrubbing process.

More specifically, this invention relates to the control of a mist scrubbing process in which two or more different chemicals are employed to remove reactive contaminants from a gas stream.

2. Description of the Prior Art

A technique, which has come to be known as mist scrubbing, has recently been developed for removing contaminants, particularly odorous contaminants, from gas streams. The process uses an aqueous solution of one or more chemicals which are reactive toward the odorous contaminants. Contact between the reagent solution and the gas is accomplished by atomizing the aqueous chemical solution into very tiny liquid droplets and dispersing the droplets into the gas stream. The liquid droplets are sized such that they do not immediately settle out but instead drift with the gas much in the manner of a natural fog. Typical installations utilize droplets having a number median diameter on the order of about ten microns.

After the atomized reagent droplets are dispersed into the gas stream, the resulting suspension is passed in cocurrent fashion through a reaction chamber or scrubber vessel. It is usual practice to introduce the reagent droplet suspension into the top of the scrubber vessel and remove a cleaned gas stream from the bottom of the vessel. Provision is also made to remove a liquid stream, consisting of settled out spray liquid, from the bottom of the contacting vessel. The vessel contains no packing or internal media of any kind and is sized to provide the desired reaction time, typically ranging from about five to thirty seconds or more, between the gas and reagent droplets.

Mist scrubbing systems are always of once-through type with no recirculation of the reagent solutions. That characteristic alone provides many advantages over traditional spray scrubbing systems which recirculate the scrubbing liquid. Other substantial advantages are presented by mist scrubbers as well. The tiny droplet size provides a huge reactive surface area compared to more conventional gas-liquid contacting processes. The close spacing of liquid droplets while suspended in the gas stream vastly increases the chances for collision, and subsequent reaction, between contaminant gas molecules and the chemical reagent droplets. Finally, the extended contact time made available because of the very slow droplet settling rate allows reactions to be carried to substantial completion. Thus, it is possible to obtain removals of odorous contaminants such as hydrogen sulfide from gas streams to a level well below one part per million using essentially stoichiometric amounts of reagent chemicals in the reagent liquid.

The mist scrubbing process found early use in the treatment of malodorous process gas streams such as those generated in rendering operations as is shown by applicant's earlier patent, U.S. Pat. No. 4,125,589. In order to obtain a stable mist as is necessary for the proper functioning of the process, it is necessary that the gas stream be saturated in water vapor. Those rendering plant gas streams to which the process was first applied typically were saturated. Applicant later found, as is set out in his U.S. Pat. No. 4,238,461, that the process could be extended to relatively dry gas streams by increasing somewhat the median droplet size of the spray and controlling its droplet size relative to the temperature and humidity of the gas stream. The droplet size is adjusted so that a sufficient population of proper sized droplets remain after partial evaporation of the droplets saturate the gas stream with water vapor. This particular embodiment is presently finding extensive use in the treatment of gas streams generated in sewage treatment plants.

In many instances when two or more different chemical reagents are used in the treatment of the same gas stream, the reagent solutions can be mixed together before atomization into tiny droplets. There are occasions when differences in chemical reactivity of the contaminant compounds carried in the gas stream require the use of two or more different reagents which are reactive one toward the other. In these circumstances, it is conventional to treat the gas in multiple stages using a different reagent in each stage. Rather than treating a gas stream in a serial fashion, applicant has found it to be possible to simultaneously remove two or more chemically dissimilar contaminants within the same reaction chamber using multiple reagents which react with each other. This is accomplished by separately atomizing solutions of the different reagents into the gas stream and allowing the spray droplets to settle unimpeded to the bottom of the treatment zone. A description of that process is found in applicant's U.S. Pat. No. 4,225,566.

The concentration of contaminant compounds in the gas being treated often varies widely over relatively short periods of time. Such variation is especially common with gas streams generated in sewage treatment plants. Consequently, it is a practical necessity to provide some means for controlling the feed rate of chemical reagent into the scrubbing vessel. Such control is conventionally accomplished by measuring some characteristic, often pH or electrical conductivity, of the settled out spray liquid as it drains from the scrubber vessel and controlling the reagent feed rate as a function of that measurement. An example of such an approach to process control is shown by a patent to Tzavos, U.S. Pat. No. 4,172,880.

That approach works well in chemically simple systems in which one reagent reacts with and removes the offensive contaminants. Other systems, especially those which treat gases containing odorous sulfur compounds, require the use of a mixture of chemical reagents in order to achieve adequate odor removal. It is known to use a combination of chemical reagents including an oxidizing agent such as hydrogen peroxide together with a base such as sodium hydroxide to remove sulfur compounds from natural gas; see for example U.S. Pat. No. 4,462,968 to Tazuma et al. That same combination of chemicals also finds use in the removal of hydrogen sulfide from saturated geothermal steam as is disclosed by Castrantas in U.S. Pat. No. 4,574,076.

It has now become common to use a mixture of a base and an oxidizing agent as the chemical reagents in mist scrubbing systems employed to remove odorous contaminants from gas streams generated in sewage treatment plants and similar installations. Sodium hydroxide is commonly employed as the base while the oxidizing agent is ordinarily sodium hypochlorite. Further, it is conventional to control such processes by measuring the pH of the settled out spray liquid exiting from the scrubber vessel and to use that measurement for the control of the feed rate of the basic reagent. The injection rate of the basic reagent is usually adjusted to maintain a pH setpoint in the reactor drain liquid of about 9.0 to 9.5. At this pH level, essentially 100% of the hydrogen sulfide dissolved in the spray liquid is theoretically present as the HS ion which should ensure substantially complete removal of hydrogen sulfide and like compounds from the gas stream.

Applicant has found that control of a mist scrubbing system by pH measurement of the drain liquid is inadequate for those installations treating gas streams having varying levels of odorous contaminants. As the concentration of odorous contaminants varies, there results either a carry-over of oxidizing reagent with the exiting gas stream or an incomplete removal of odorous compounds, particularly hydrogen sulfide. Neither of those results are acceptable, especially in urban areas where most odor removal installations are located.

SUMMARY OF THE INVENTION

The operation of a mist scrubbing system employing at least two different chemical reagents is controlled by measuring a property of the reactor drain liquid and adjusting the injection rate of one of the reagents in response to that measurement while at the same time measuring the concentration of a contaminant compound in the gas exiting the reactor and adjusting the injection rate of a second reagent in response to that second measurement. There results a much more precise degree of process control than is possible using conventional methods with essentially complete contaminant removal while holding reagent useage to a minimum and avoiding carry-over of reagent in the treated gas stream.

Hence, it is an object of this invention to provide a process for the control of a mist scrubbing system.

It is a further object of this invention to provide a method and means to ensure contaminant removal and avoid reagent carry-over in the operation of a mist scrubbing system.

A specific object of this invention is to provide a method and means for attaining the substantially complete removal of odorous compounds from waste gas streams while avoiding carryover of treating reagent in the cleaned gas stream.

DESCRIPTION OF THE DRAWING

The sole FIGURE shows a schematic diagram of a system according to the present invention.

DETAILED DESCRIPTION OF THE INVENTION

The FIGURE illustrates in generally schematic form one preferred embodiment of the invention. Referring now to the FIGURE, a feed gas containing offensive contaminants is provided to reaction chamber 11 through conduit means 12. An aqueous reagent reactive toward the gas contaminants is supplied to atomizing nozzle 14 by way of conduit 15. Nozzle 14 is preferably located in close proximity to the entry point of the feed gas into chamber 11.

The feed gas, now depleted in its offensive contaminants, exits the reaction chamber 11 through stack 16 which is positioned at the end of chamber 11 opposite to the gas entry. Liquid drain means 17 are provided at the lowest point of chamber 11 to remove settled out spray liquid from the chamber.

A probe 18 is located within drain line 17 to provide a continuous measure of a property, typically pH, of the outgoing scrubber drain liquid. An output signal from the probe is transmitted over signal wire 19 to analyzer-controller 20 which adjusts the output stream 36 of the first reagent metering pump 21 to maintain the probe output signal at its set point.

An analyzer 22 is positioned to sample and to analyze on a semi-continuous or continuous basis samples of the scrubbed gas exiting from the reaction chamber through stack 16 to determine the residual concentration of one or more of the contaminant compounds contained in the feed gas. A signal representative of the concentration of the contaminant compound is transmitted by way of signal wire 23 to a controller 24. Controller 24 adjusts the output of second reagent metering pump 25 according to the signal received from analyzer 22 in a fashion so as to proportionally increase the reagent feed rate as the concentration of the contaminant compound exceeds a preset level.

There is provided tankage 26 for the storage of a quantity of the first reagent chemical to supply metering pump 21 by way of conduit 27. Likewise, storage means 28 is provided to supply the second reagent chemical to metering pump 25 by way of feed line 29. In a preferred embodiment, the first reagent chemical stream 30 supplied by pump 21 and the second reagent chemical stream 31 supplied by pump 25 are merged and mixed in dilution manifold 32. A diluting water stream 33 is also supplied to manifold 32 from storage means 34. The diluted and mixed reagents then are supplied to nozzle 14 by way of conduit 15. An atomizing gas stream 35, typically compressed air, is provided to nozzle 14 in order to provide the energy for atomizing the incoming liquid reagent stream.

The invention has numerous industrial applications. One particularly important use of the invention is in the removal of odors from air or other gas streams in the treatment of sewage and other biological wastes. In the case of sewage treatment plants, relatively high volume air streams carrying offensive levels of odorous compounds are ordinarily produced in the operation of aeration basins, trickling filters, pumping stations and like facilities. The odorous compounds include those commonly associated with fecal matter such as the indoles and skatoles and sulfur-containing compounds including mercaptans and sulfides, particularly hydrogen sulfide.

When used in the treatment of sewage derived gas streams, this invention provides an essentially complete removal of odors under automatic operation even while the odor load varies widely. In such operations, the reaction vessel is typically of cylindrical configuration with the gas stream to be treated entering tangentially near the top of the vessel and exiting from the bottom side thereof. A nozzle capable of atomizing the aqueous reagent into tiny droplets having a number median diameter on the order of ten to fifteen microns is positioned near the gas entry so that the nozzle plume mixes with the incoming gas. The reaction vessel is sized such that the residence time of gas within the vessel is at least about five seconds and more typically about ten to twenty seconds.

A wide variety of bases can be used as reagents in the process but for reasons of convenience and economy either sodium hydroxide or sodium carbonate are ordinarily employed. The base of choice is usually sodium hydroxide. There are also a number of oxidizing agents which may be employed in the process. These include chlorine dioxide, hydrogen peroxide, ozone, sodium hypochlorite and various permanganates. Sodium hypochlorite is ordinarily the oxidizing agent of choice. Sodium hypochlorite is preferably used in combination with sodium hydroxide as it normally contains sodium hydroxide as an impurity.

The reagent concentration in the spray droplets is not critical but preferably is relatively low. When using sodium hypochlorite as the oxidizing agent in the removal of sewage derived odors, hypochlorite concentration in the spray droplets may range broadly from about 500 ppm to 5% and usually will range from about 500 to about 5000 ppm. Chemical useage depends upon the concentration of reactive odorous compounds in the gas being treated; typical requirements being about 2 to 2.5 mols of hypochlorite per mol of hydrogen sulfide present in the gas stream. On a theoretical basis, it requires 1.5 mols of hypochlorite to oxidize 1 mol of hydrogen sulfide and, if hydrogen sulfide is the only reactive contaminant present, an essentially stoichiometric reaction can easily be achieved. However, here always exists a background concentration of other reactive odorous compounds which increases hypochlorite useage above that calculated on the basis of hydrogen sulfide concentration alone. The concentration of sodium hydroxide or other base in the incoming reagent stream is controlled totally by the pH setpoint for the reactor drain liquid.

The pH setpoint for the reactor drain liquid is typically 9.0 to 9.5 for those gases containing hydrogen sulfide. That pH level is selected as it is the lowest pH at which essentially all of the hydrogen sulfide dissolved in the liquid reagent is present as the HS ion. At least on a theoretical basis, the maintaining of the reactor drain liquid pH at or above about 9.0 would ensure essentially complete removal of hydrogen sulfide from the feed gas stream even were there far less than stoichiometric amounts of oxidizing agent present. Applicant has found that not to be the case. Prior to this invention, the oxidizing agent was introduced at a fixed rate sufficient to react with maximum levels of hydrogen sulfide ordinarily encountered. Because the levels of hydrogen sulfide and other odorous compounds vary widely over the course of a day, excess oxidizing agent was often present. That circumstance led to the carry over of hypochlorite in the exiting gas stream provoking complaints of "swimming pool" type odors down wind of the installation. Backing off of the hypochlorite feed rate to lower levels would result in periodic break throughs of hydrogen sulfide in the exit gas again provoking complaints.

As can be appreciated, the instant invention provides a simple and completely automatic method for controlling a mist scrubbing operation to ensure essentially total odor removal while holding reagent consumption to an absolute minimum. The invention has been described primarily in relation to its use with sewage derived odors but is useful as well in numerous other applications. Examples of other uses include the treating of gaseous effluents from industrial processes such as coke ovens, paper mills and the like. The embodiments and details set out above are for the purpose of illustrating the invention. It will be apparent to those skilled in the art that various changes and modifications can be made thereto without departing from the scope of the invention.

I claim:

1. A method for controlling a mist scrubbing process wherein a feed gas containing odorous and acidic contaminants is cocurrently contacted with a finely divided spray of an aqueous reagent, said reagent comprising an oxidizing agent and a base, said method comprising:

separately metering a first solution of base and a second solution of oxidizing agent;

merging said first and second solutions to form a stream of aqueous reagent;

atomizing said aqueous reagent and introducing the resulting spray of tiny reagent droplets into said feed gas adjacent the inlet to a reaction chamber to form a suspension of liquid droplets in said gas;

passing said suspension through the reaction chamber and removing settled out spray liquid and a scrubbed gas stream from said reaction chamber;

measuring the pH of said settled out liquid and controlling the rate at which said first solution is metered so as to maintain the pH of the settled out liquid at a setpoint; and measuring the residual concentration of at least one of said acidic contaminants in said scrubbed gas stream and increasing the rate at which said second solution is metered when said residual concentration exceeds a setpoint.

2. The method of claim 1 wherein said reaction chamber is vertically extending, wherein said feed gas is introduced at an inlet near the top thereof, and wherein said scrubbed gas stream exits from the bottom side of said chamber.

3. The method of claim 2 wherein said chamber is sized so that the residence time of gas within said chamber is at least five seconds.

4. The method of claim 1 wherein said base is selected form the group consisting of sodium hydroxide and sodium carbonate.

5. The method of claim 1 wherein said oxidizing agent is selected from the group consisting of chlorine dioxide, hydrogen peroxide, ozone, sodium hypochlorite and permanganates.

6. The method of claim 1 wherein at least one of said acidic contaminants is hydrogen sulfide and wherein said oxidizing agent comprises sodium hypochlorite.

7. The method of claim 6 wherein the pH of said settled out liquid is maintained at or above 9.

8. The method of claim 6 wherein said base is sodium hydroxide.

9. The method of claim 6 wherein the concentration of sodium hypochlorite in said reagent droplets is in the range of about 500 to 5,000 ppm.

10. In a mist scrubbing process wherein a feed gas containing contaminant compounds is cocurrently contacted in a reaction zone with a finely divided spray containing at least two different chemical reagents to produce a scrubbed gas stream and settled out spray liquid, the improvement comprising:

controlling operation of the process by measuring the pH of the settled spray liquid and adjusting the injection rate of a first chemical reagent into said reaction zone as a function of said measurement while at the same time measuring the concentration of a contaminant compound in said scrubbed gas stream and adjusting the injection rate of a second chemical reagent into said reaction zone as a function of said measured concentration.

11. The process of claim 10 wherein said first chemical reagent is a base.

12. The process of claim 10 wherein said second chemical reagent is an oxidizing agent.

13. The process of claim 10 wherein said contaminant compounds include hydrogen sulfide and wherein said oxidizing agent is sodium hypochlorite.

14. The process of claim 13 wherein said first chemical reagent is sodium hydroxide.

15. The process of claim 14 wherein the injection rate of said sodium hydroxide is adjusted so as to maintain the pH of said settled spray liquid at or above 9.

16. Apparatus for carrying out a mist scrubbing process in which contaminants are removed from a gas stream comprising:

a reaction chamber having a gas inlet and a gas exit, the interior of said chamber devoid of packing;

nozzle means adapted to atomize an aqueous reagent and positioned to direct the resulting droplet spray into a gas stream entering said inlet;

drain means to convey settled out spray liquid from said reaction chamber;

means positioned in said drain means to measure the pH of said settled out liquid and to produce a signal as a function of that measurement;

means to meter the flow rate of a first chemical solution in response to said signal;

means positioned to sample gas exiting from said chamber and to measure the residual concentration of at least one of the contaminants present in said gas stream and to produce a second signal as a function of that measured concentration;

means to meter the flow rate of a second chemical solution in response to said second signal;

means to merge said first and second chemical solutions to form said aqueous reagent; and means to convey said reagent to said nozzle.

17. The apparatus of claim 16 wherein said means to measure the pH of said settled out liquid is a probe.

* * * * *